United States Patent
Chen et al.

(10) Patent No.: US 9,362,814 B2
(45) Date of Patent: Jun. 7, 2016

(54) SWITCHED-CAPACITOR DC-DC CONVERTER

(75) Inventors: Wu Chen, Nanjing (CN); Qin Huang, Cary, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 14/368,095

(22) PCT Filed: Jan. 15, 2012

(86) PCT No.: PCT/US2012/021401
§ 371 (c)(1),
(2), (4) Date: Nov. 20, 2014

(87) PCT Pub. No.: WO2013/095685
PCT Pub. Date: Jun. 27, 2013

(65) Prior Publication Data
US 2015/0077085 A1     Mar. 19, 2015

Related U.S. Application Data

(60) Provisional application No. 61/580,167, filed on Dec. 23, 2011.

(51) Int. Cl.
*H02M 1/08*     (2006.01)
*H02M 3/158*    (2006.01)
(Continued)

(52) U.S. Cl.
CPC .................. *H02M 1/08* (2013.01); *H02J 3/386* (2013.01); *H02M 3/158* (2013.01); *H02M 2001/0077* (2013.01); *Y02B 70/1425* (2013.01); *Y02E 10/763* (2013.01)

(58) Field of Classification Search
CPC ......... H02M 3/06; H02M 3/158; H02M 1/08; H02M 2001/0077; H02M 2001/0093; Y02E 10/763; Y02E 70/10

USPC ........................... 363/60, 15, 43, 34; 232/280
See application file for complete search history.

(56) References Cited

U.S. PATENT DOCUMENTS

| | | | |
|---|---|---|---|
| 5,008,795 A | 4/1991 | Parsley et al. | |
| 5,270,913 A | 12/1993 | Limpaecher | |

(Continued)

FOREIGN PATENT DOCUMENTS

| | | |
|---|---|---|
| JP | 63-154061 | 6/1988 |
| JP | 09-191638 | 7/1997 |

(Continued)

OTHER PUBLICATIONS

Notification of Transmittal of the International Search Report and the Written Opinion of the International Searching Authority, or the Declaration for International Application No. PCT/US2012/021401 (Dec. 18, 2012).

(Continued)

*Primary Examiner* — Jessica Han
*Assistant Examiner* — Demetries A Gibson
(74) *Attorney, Agent, or Firm* — Jenkins, Wilson, Taylor & Hunt, P.A.

(57) ABSTRACT

A high power density switched-capacitor DC-DC converter is disclosed. According to one aspect, the subject matter described herein includes a high power-density switched-capacitor DC-DC converter that includes: first and second voltage summing circuits, each voltage summing circuit producing an output voltage that is substantially equal to an input voltage; and a switching circuit connected between the first and second voltage summing circuits and configured to provide a DC voltage source as an input to the first and second voltage summing circuits, wherein the converter produces an output voltage that is the sum of the voltage produced by the first voltage summing circuit, the voltage provided by the DC voltage source, and the voltage produced by the second voltage summing circuit.

11 Claims, 7 Drawing Sheets

(51) Int. Cl.
*H02J 3/38* (2006.01)
*H02M 1/00* (2006.01)

(56) References Cited

U.S. PATENT DOCUMENTS

| | | | |
|---|---|---|---|
| 5,357,419 | A | 10/1994 | Limpaecher |
| 5,561,597 | A | 10/1996 | Limpaecher |
| 5,691,631 | A | 11/1997 | Shimamori et al. |
| 5,764,501 | A | 6/1998 | Limpaecher |
| 5,986,907 | A | 11/1999 | Limpaecher |
| 6,118,678 | A | 9/2000 | Limpaecher |
| 6,198,645 | B1 | 3/2001 | Kotowski et al. |
| 7,402,983 | B2 | 7/2008 | Jacobson |
| 7,659,700 | B2 | 2/2010 | Holveck |
| 7,795,761 | B2 | 9/2010 | Huynh et al. |
| 8,036,008 | B2 | 10/2011 | Ikeda et al. |
| 8,040,702 | B2 | 10/2011 | Urakabe et al. |
| 2004/0257272 | A1* | 12/2004 | Jacobson ............... H01Q 3/30 342/175 |
| 2007/0014135 | A1 | 1/2007 | Taurand |
| 2008/0129258 | A1 | 6/2008 | Taurand |
| 2009/0261793 | A1* | 10/2009 | Urakabe ............... H02J 7/0016 323/282 |
| 2010/0019753 | A1 | 1/2010 | Ikeda et al. |
| 2011/0044076 | A1 | 2/2011 | Zhang et al. |
| 2013/0163302 | A1 | 6/2013 | Li |

FOREIGN PATENT DOCUMENTS

| | | |
|---|---|---|
| JP | 2002-369500 | 12/2002 |
| JP | 2006-262619 A | 9/2006 |

OTHER PUBLICATIONS

Non-Final Office Action for U.S. Appl. No. 13/723,915 (Sep. 23, 2015).
Final Office Action for U.S. Appl. No. 13/723,915 (Apr. 2, 2015).
Non-Final Office Action for U.S. Appl. No. 13/723,915 (Aug. 20, 2014).
Denniston et al., "Multiple-module high-gain high-voltage DC-DC transformers for offshore wind energy systems," IEEE Transactions on Industrial Electronics, vol. 58, No. 5, pp. 1877-1886, May 2011.
"China became top wind power market in 2009: consultant," https://web.archive.org/web/20100828142910/http://www.reuters.com/article/idUSTRE62S12620100329, pp. 1-3 (Aug. 28, 2010).
Sano et al., "Performance of a high-effeciency switched-capacitor-based resonant converter with phase-shift control," IEEE Trans. Power Electron., vol. 26, No. 2, pp. 344-354, (2011).
"EACO Capacitor-Solutions for power electronics," https://web.archive.org/web/20110922225511/http://www.eaco-capacitor.com.cn/product.html, pp. 1-2 (Sep. 22, 2011).
Chen et al., "A comparison of medium voltage high power DC/DC converters with high step-up conversion ratio for offshore wind energy systems," IEEE Energy Conversion Congress and Exposition (ECCE 2011), pp. 584-589, Sep. 2011.
Dzhankhotov et al., "A new passive hybrid air-core foil filter for modern power drives," IEEE Trans. Ind. Electron., vol. 58, No. 5, pp. 1757-1762, (2011).
Tan et al., "Adaptive mixed on-time and switching frequency control of a system of interleaved switched-capacitor converters," IEEE Trans. Power Electron., vol. 26, No. 2, pp. 364-380, (2011).
Liserre et al., "Overview of Multi-MW Wind Turbines and Wind Parks," IEEE Transactions on Industrial Electronics, Voc. 58, No. 4, pp. 1081-1095, (2011).
"An introduction to the air cored coil," https://web.archive.org/web/20100724034726/http://info.ee.surrey.ac.uk/Workshop/advice/coils/air_coils.html, pp. 1-10 (Jul. 24, 2010).
Shuai et al., "A Non-Insulated Resonant Boost Converter," Twenty-Fifth Annual IEEE Applied Power Electronics Conference and Exposition, pp. 550-556, Feb. 21-25, 2010.
Steimer et al., "Medium voltage power conversion technology for efficient windpark power collection grids," IEEE International Symposium on Power Electronics for Districuted Generation Systems (PEDG), pp. 12-18, (2010).
Cao et al., "Zero-current-switching multilevel modular switched-capacitor DC-DC converter," IEEE Trans. Ind. Appll., vol. 46, No. 6, pp. 3516-3522, (2010).
Muyeen et al., "Operation and Control of HVDC-connected offshore wind farm," IEEE Trans. Sustainable Energy, vol. 1, No. 1, pp. 30-37, (2010).
Cao et al., "A family of zero current switching switched-capacitor DC-DC converters," IEEE APEC, pp. 1365-1372, (2010).
Robinson et al., "Analysis and design of an offshore wind farm using a MV DC grid," IEEE Trans. Power Delivery, vol. 25, No. 4, pp. 2164-2173, (2010).
Ortiz et al., "1 Megawatt, 20 kHz, isolated, bidirectional 12kV to 1.2kV DC-DC converter for renewable energy applications," IEEE IPEC, pp. 3212-3219, (2010).
Zhan et al., "DC Transmission and Distribution System for a Large Offshore Wind Farm," IET ACDC, pp. 1-5, (2010).
Das et al., "A 13kV 4H-SiC n-channel IGBT with Low Rdiff,on and Fast Switching," Materials Science Forum, vol. 600-603, pp. 1183-1186, (2009).
Jovcic, "Step-up DC-DC converter for MWt size applications," IET Power Electron., vol. 2, No. 6, pp. 675-685, (2009).
Robinson et al., "VSC HVDC transmission and offshore grid design for a linear generator based wave farm," Canadian Conference on Electrical and Computer Engineering (CCECE), pp. 54-58, (2009).
Max, "Design and control of a DC collection grid for a wind farm," PhD Thesis, Dep of Energy and Environmnet, Chalmers University of Technology, Sweden, (2009).
Jovcic, "Bidirectional, High-Power DC Transformer," IEEE Trans. Power Del., vol. 24, No. 4, pp. 2276-2283, (2009).
Seeman et al., "Analysis and optimization of switched-capacitor DC-DC converters," IEEE Trans. Power Electronics, vol. 23, No. 2, pp. 841-851, (2008).
Max et al., "System Efficiency of a DC/DC Converter-based Wind Farm," Wind Energy, pp. 109-120, (2008).
Max et al., "Control method and snubber selection for a 5 MW wind turbine single active bridge DC/DC converter," European Conference on Power Electronic and Applications, pp. 1-10, (2007).
Meyer et al., "Design of a Three-Phase Series Resonant Converter for Offshore DC Grids," IEEE IAS, pp. 216-223, (2007).
Meyer et al., "Control and Design of DC-Grids for Offshore Wind Farms," IEEE Trans. Ind. Appli., vol. 43, No. 6, pp. 1148-1154, (2007).
Law et al., "Design and Analysis of Switched-Capacitor-Based Step-Up Resonant Converters," IEEE Transactions of Circuits and Systems—I: Regular Papers, vol. 52, No. 5, (May 2005).
Pan et al., "Power losses and efficiency analysis of multilevel DC-DC converters," Proc. IEEE Appl. Power Electron. Conf., pp. 1393-1398, (Mar. 2005).
Yeung et al., "Unified analysis of switched-capacitor resonant converters," IEEE Trans. Ind. Electron., vol. 51, No. 4, pp. 864-873, (2004).
Martander et al., "DC grid for wind farms," Licentiate of Engineering Thesis, Dep. Of EPE, Charlmers University of Technology, Sweden, (2002).
Ioinovici, Switched-capacitor power electronics circuits,: IEEE Trans. Circuits Syst. Mag., vol. 1, No. 3, pp. 37-42, (2001).
Maksimović et al., "Switched-capacitor DC-DC converters for low-power on-chip applications," Proc. IEEE Power Electron. Spec. Conf., vol. 1, pp. 54-59, (1999).
Wu et al., "MOS charge pumps for low-voltage operation," IEEE, Journal of Solid-State Circuits, vol. 33, No. 4, pp. 592-597, (Apr. 1998).
Makowski et al., "Performance limits of switched-capacitor DC-DC converters," IEEE Power Electron. Spec. Conf., Jun. 18-22, pp. 1215-1221, (1995).

* cited by examiner

US 9,362,814 B2

SWITCHED-CAPACITOR DC-DC CONVERTER

PRIORITY CLAIM

This application claims the benefit of U.S. Provisional Patent Application Ser. No. 61/580,167, filed Dec. 23, 2011; the disclosure of which is incorporated herein by reference in its entirety.

TECHNICAL FIELD

The subject matter described herein relates to medium voltage high power direct current to direct current (DC-DC) converters which can be used to generate output voltages in the tens of thousands of kilovolts range. More particularly, the subject matter described herein relates to a high power density switched-capacitor DC-DC converter.

BACKGROUND

Public, private, or government-owned power utility companies generate and distribute power over a distribution infrastructure colloquially called a "power grid", a "national grid", or just "the grid". Power grids typically use high voltage power lines to distribute power over long distances because using higher voltages reduces the energy lost in long-distance transmission. In the United States, for example, long-distance power transmission lines use higher voltages such as 138,000 V and 765,500 V. At the destination, the voltage is stepped down to tens of thousands of Volts for distribution to customer sites, where the voltage is again stepped down to household voltages such as 120V and 240V in the United States and 100V and 200V in other countries.

Traditionally, power grids transmit power as high voltage alternating current, or HVAC. Historically, AC has been used instead of DC for two reasons. First, when power grids were first being built, it was relatively easy to use transformers to step up the voltage of AC lines to create the high voltages necessary to travel enough distance to make distribution feasible, but transformers don't work for DC and there was nothing else at the time that could step up DC voltages to the needed levels. Second, then and now, the vast majority of power is generated by coal-, gas-, or nuclear-filed steam turbines, which are designed to run at a constant speed and which produce AC power at the grid frequency, which is 60 MHz in the United States and 50 MHz in other countries.

Lately, however, interest in alternative energy sources has increased. Wind power, for example, is attractive as a renewable, non-polluting energy source. Unlike steam turbine generators, however, wind-driven turbines, or wind-turbines, do not always run at the same speed; their speed may fluctuate as the wind speed of prevailing winds fluctuates, which makes it difficult to control the frequency of the AC output. This makes wind-driven turbines unsuitable as a power generator in an AC power grid with a fixed frequency and phase.

One solution to the problem of fluctuating wind-turbine speed and AC output frequency is to convert the AC output of the wind turbine to DC via a rectifier and regulate the DC output using a regulator, but the DC output must then be converted back to AC using a device called an inverter and have its voltage stepped up with a transformer before being added to the power grid. Even if the power grid itself is HVDC, the voltage output by the wind turbine, whether AC or DC, is not in the 138 kV~765.5 kV range required for transmission. This means that either a transformer is required to step up the AC output of the wind turbine to the high voltages required before rectification, or a high-voltage DC-DC converter is required to convert the low-voltage rectified output of the wind turbine to the high voltages required.

Because transformers are big, heavy, and relatively difficult to design to precise tolerances, there has been some interest in the use of high-voltage DC-DC converters to step-up the rectified output of a wind turbine to the voltages required for transmission and/or distribution. However, conventional DC-DC converters also have their shortcomings. This can be best illustrated by looking at the conventional DC-DC converter shown in FIG. 1.

FIG. 1 is a circuit diagram of a conventional DC-DC switched-capacitor converter called a Cockcroft-Walton multiplier. A voltage input $V_{IN}$ supplies the bottom of a capacitor ladder made up of capacitors $C_1$, $C_2$, $C_3$, and $C_4$. A series of switches labeled $S_1$ through $S_9$, which in this example are insulated gate bipolar junction transistors or IGBTs, control how $V_{IN}$ is connected to the capacitor ladder and also control how charge may flow from capacitor to capacitor through the ladder. Each switch has a control terminal or gate that is driven by a control voltage that is labeled to indicate a phase of operation: voltages having names starting with $V_A$ active (and their corresponding switches are closed) during a first phase of operation and voltages having names starting with $V_B$ are active (and their corresponding switches are closed) during a second phase of operation. Thus, FIG. 1, in the first phase of operation, all odd-numbered switches are closed and all even-numbered switches are open, while in the second phase of operation, all even-numbered switches are closed and all odd-numbered switches are open.

The conventional switched capacitor converter design shown in FIG. 1 suffers from several disadvantages. Each additional rung of the capacitor ladder requires an additional active switch, such as an IGBT. Since each rung of the capacitor ladder outputs a higher voltage than the previous rung, the control voltages input into the switches must be correspondingly higher as well. This requires the addition of a voltage control block, VCONTROL, which must provide a higher voltage for each subsequent rung up the capacitor ladder. For example, switch $S_5$ has one terminal connected to the positive terminal of $V_{IN}$, which means that control voltage $V_{A1}$ must be higher than $V_{IN}$ by at least a turn-on threshold voltage ($V_T$) in order to turn $S_5$ on. As shown in FIG. 1, VCONTROL must provide a voltage $V_{A1}$ that is at least equal to $V_{IN}+V_T$. Likewise, capacitor $C_1$ will charge to a voltage $V_{C1}$, which will be higher than $V_{IN}$, so control voltage $V_{B1}$ must be greater than or equal to $V_{C1}+V_T$ in order to turn on. As shown in FIG. 1, VCONTROL must provide a voltage $V_{B1}$ that is at least equal to $V_{C1}+V_T$. As additional stages are added to the top of the capacitor ladder, the control voltages provided by VCONTROL must be ever higher.

Thus, not only does the conventional switched capacitor converter design illustrated in FIG. 1 require many active switches, the design also requires a complex voltage control circuit that provides control signals with very large voltages. These two characteristics of the conventional switched capacitor converter illustrated in FIG. 1 impose a design constraint that limits the maximum output voltage that may be produced by this design.

FIG. 2 is a circuit diagram of another conventional DC-DC switched-capacitor converter that is commonly referred to as a "voltage doubler" converter. A set of switches labeled $S_1$ through $S_8$ are configured such that in one state, even numbered switches are closed while odd numbered switches are open, and in another state, add numbered switches are closed while even numbered switches are open. By toggling between these two states, capacitor $C_1$ is charged to a value=Vin, and capacitor $C_2$ is charged to a value=2×Vin. Capacitor $C_3$ is charged to the value of $C_2$, i.e., 2×Vin, and capacitor $C_4$ is charged to twice the value of $C_2$, i.e., 4×Vin.

The conventional switched capacitor converter design shown in FIG. 2 also suffers from some disadvantages, including the need to create higher control voltages such as $V_{A1}$, $V_{B2}$, $V_{A3}$, and $V_{B4}$. In addition, capacitor $C_2$ must be rated for a voltage=2×Vin and capacitor $C_4$ must be rated for a voltage=4×Vin. As additional voltage doubling stages are added the output capacitor for that stage must be rated for twice the voltage as the output capacitor for the previous stage. Another characteristic of the conventional DC-DC converters shown in FIGS. 1 and 2 is that Vin and Vout share the same ground node.

Accordingly, in light of these disadvantages associated with conventional converter designs, there exists a need for a high power density switched-capacitor converter.

SUMMARY

According to one aspect, the subject matter described herein includes a high power-density switched-capacitor DC-DC converter that includes: first and second voltage summing circuits, each voltage summing circuit producing an output voltage that is substantially equal to an input voltage; and a switching circuit connected between the first and second voltage summing circuits and configured to provide a DC voltage source as an input to the first and second voltage summing circuits, wherein the converter produces an output voltage that is the sum of the voltage produced by the first voltage summing circuit, the voltage provided by the DC voltage source, and the voltage produced by the second voltage summing circuit.

Portions of the subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, a high power density switched-capacitor DC-DC converter is provided. Reference will now be made in detail to exemplary embodiments of the present invention, examples of which are illustrated in the accompanying drawings. Wherever possible, the same reference numbers will be used throughout the drawings to refer to the same or like parts.

Figure 3:
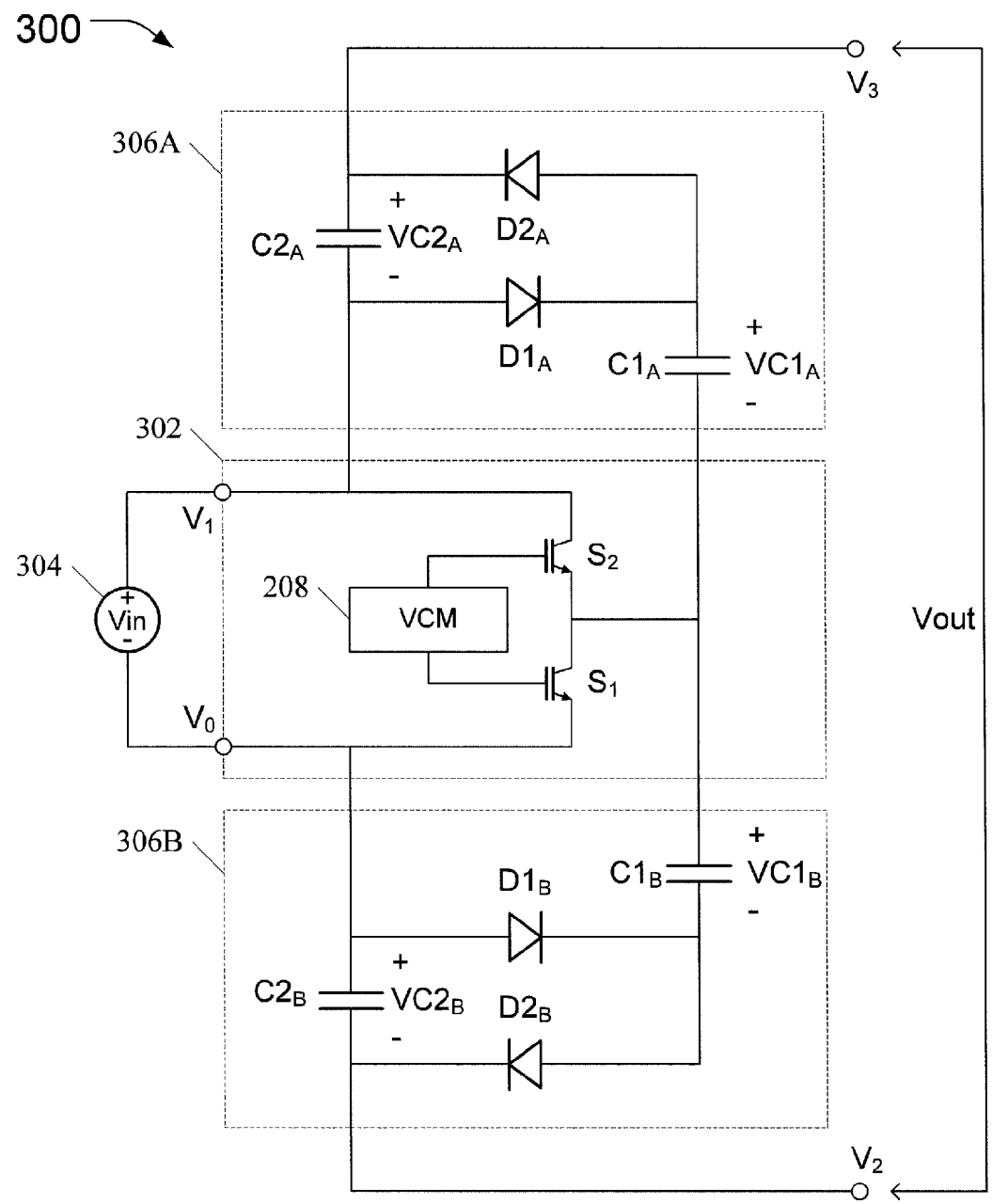
FIG. 3 is a block diagram illustrating an exemplary switched-capacitor DC-DC converter according to an embodiment of the subject matter described herein.

FIG. 3 is a block diagram illustrating an exemplary switched-capacitor DC-DC converter according to an embodiment of the subject matter described herein. In one embodiment, a high power density switched capacitor converter 300 includes a switching circuit 302 for connecting a DC voltage source, such as voltage source 304, to at least two voltage summing circuits 306. Voltage source 304 provides a first voltage V1 at one terminal and a second voltage V0 at another terminal. The difference between voltage V1 and voltage V0 is referred to as Vin. In the embodiment illustrated in FIG. 3, a first switch S1 within switching circuit 302 supplies voltage V0 to a node N when S1 is closed, and a second switch S2 within switching circuit 302 supplies voltage V1 to node N when S2 is closed. Switching circuit 304 includes a voltage control module (VCM) 208 that controls the two switches, S1 and S2.

In the embodiment illustrated in FIG. 3, voltage source 304 is connected to two voltage summing circuits, identified as voltage summing circuit 306A and 306B. However, additional voltage summing circuits 306 may be attached in series to circuits 306A and/or 306B. This will be discussed in more detail below. For ease of description, circuit 306A is said to be connected "above" switching circuit 302 and circuit 306B is said to be connected "below" switching circuit 302, reflecting their position within FIG. 3 relative to switching circuit 302.

In one embodiment, each voltage summing circuit includes a first capacitor C1, a second capacitor C2, and first and second diodes D1 and D2 coupled to the first and second capacitors. The voltage across capacitor C1 is referred to as VC1, and the voltage across capacitor C2 is referred to as VC2. The voltage produced by each voltage summing circuit 306 is measured across that circuit's capacitor C2, i.e., each summing circuit produces a voltage VC2. In the embodiment illustrated in FIG. 3, a subscript is used to identify the voltage summing circuit and the particular component being referred to. For example, diode D1 of circuit 306A is identified as diode $D1_A$, VC1 within circuit 306B is identified as $VC1_B$, and so on.

Referring to the embodiment illustrated in FIG. 3, the output voltage Vout is the difference between voltage V3 and V2. Since V3=V1+$VC2_A$ and V2=V0−$VC2_B$, $$Vout = (V1 + VC2_A) - (V0 - VC2_B)$$
$$= (V1 - V0) + VC2_A + VC2_B$$
$$= Vin + VC2_A + VC2_B$$

Thus, the output Vout of converter 300 is the series addition of $VC2_B$, Vin, and $VC2_A$.

Switching circuit 302 provides voltage V1 to the bottom of $C2_A$ and voltage V0 to the top of $C2_B$. During operation of converter 300, switches S1 and S2 of switching circuit 302 connect DC voltage source 304 such that in a first state, switch S1 is closed and switch S2 is open, and in a second state, switch S1 is open and switch S2 is closed. Thus, in the first state, voltage source 304 positively charges $C1_A$ and in the second state, voltage source 304 negatively charges $C1_B$. For simplicity, the specific operation will now be described for the components within circuit 306A but the same principles apply to circuit 306B.

In the first state, switch S1 connects V0 to the bottom of $C1_A$. In this state, voltage source 304 charges $C1_A$ through diode $D1_A$. This continues until $VC1_A$ is approximately equal to Vin. Diode $D2_A$ prevents the flow of charge from the top of $C2_A$ to the top of $C1_A$.

In the second state, switch S2 connects V1 to the bottom of $C1_A$. This causes the voltage at the top of $C1_A$ to equal Vin+ $VC1_A$. In this state, $C1_A$ charges $C2_A$ through diode $D2_A$. This continues until $VC2_A$ is approximately equal to Vin. $D1_A$ prevents the flow of charge from the top of $C1_A$ back to voltage source 304.

After several repetitions, voltage $VC2_A \approx Vin$. Voltage $VC2_B \approx Vin$ as well. Thus, the output of converter 300 becomes $\approx 3 \times Vin$.

Figure 1:
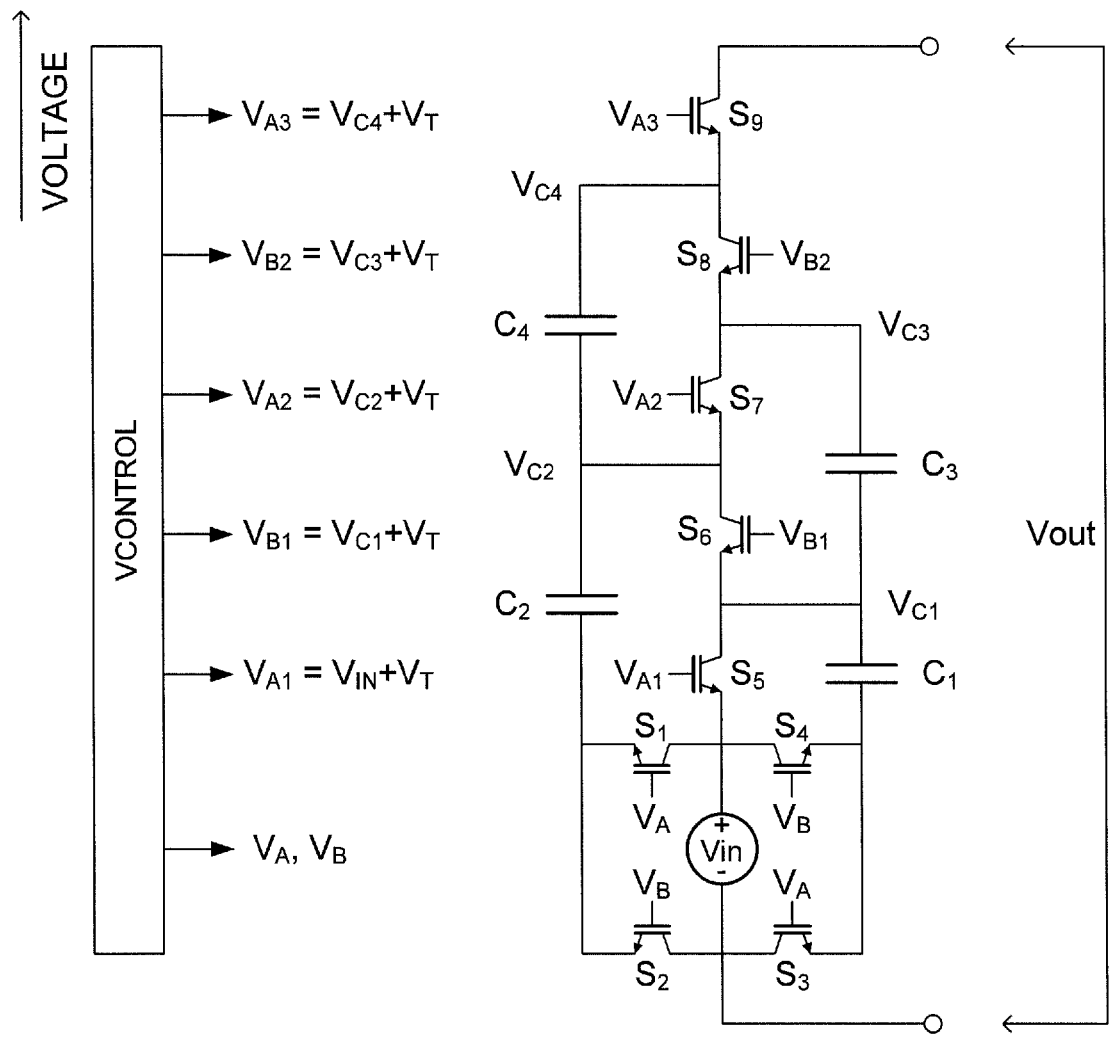
FIG. 1 is a circuit diagram of a conventional DC-DC switched-capacitor converter.

Thus, in contrast to the conventional converter design shown in FIG. 1, converter 300 does not need a complicated switch tree, but instead requires only a pair of switches S1 and S2. An additional advantage of converter 300 is that the voltage ripple seen on Vout is smaller than the voltage ripple that is seen on the output of the converter shown in FIG. 1. The dual-ended design of converter 300 produces a ripple on V3 that is 180 degrees out of phase with the ripple produced on V2; the ripples partially cancel out each other, resulting in a smoother waveform on Vout.

Figure 2:
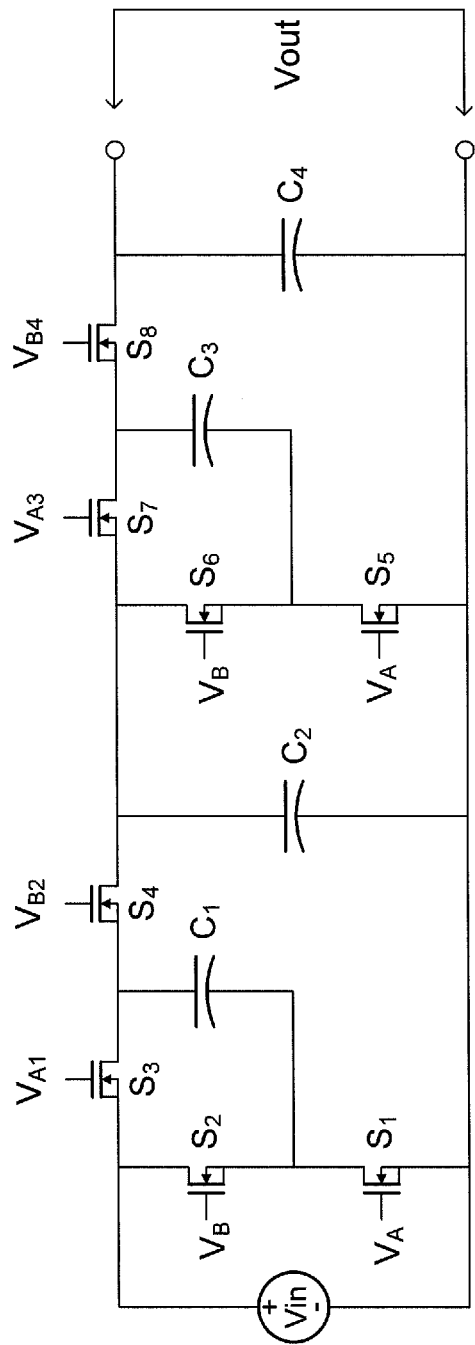
FIG. 2 is a circuit diagram of another conventional DC-DC switched-capacitor converter.

Also, in contrast to the conventional converter design shown in FIG. 2, where each successive stage requires a capacitor that is rated for the ever increasing output voltage of that stage, each capacitor within voltage summing circuits 306 store a charge that is approximately equal to Vin, and thus need only be rated to handle the voltage Vin. For example, if Vin is 1,000 V and N=9, Vout=10,000 V, yet each component within summing circuit 306—i.e., C1, C2, D1, and D2—need only be rated for 1,000V, no matter how many voltage summing circuits 306 are connected in series.

Because Vout is the difference between the output of the last voltage summing circuit above switching circuit 302 and the output of the last voltage summing circuit below switching circuit 302, converter 300 may be used to voltage shift not one but both of the absolute voltages output by Vout relative to the absolute voltages of Vin. For example, using converter 300 illustrated in FIG. 3, if Vin=10 kV, V0=0V, and V1=10 kV, then Vout=30 kV, but V2=−10 kV and V3=+20 kV relative to the 0V reference V0.

Figure 4A:
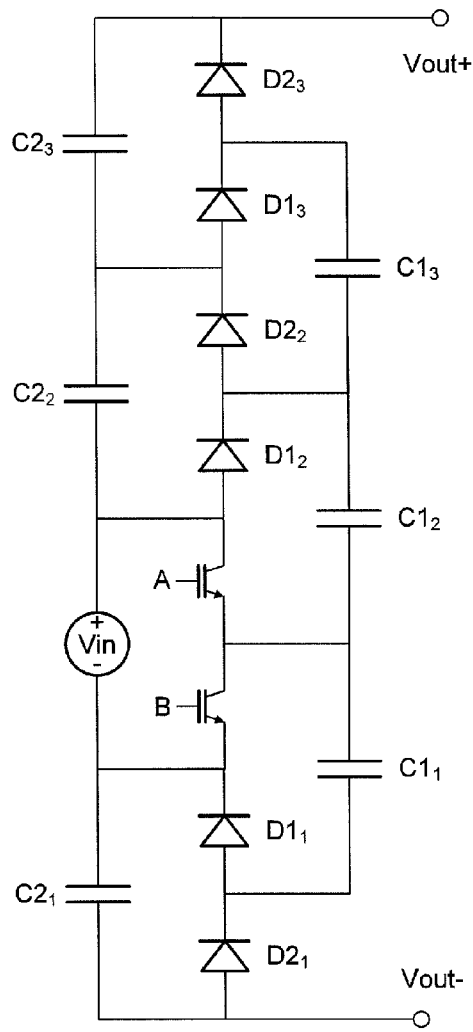
FIGS. 4A and 4B are circuit diagrams illustrating exemplary switched-capacitor DC-DC converters according to other embodiments of the subject matter described herein.
Figure 4B:
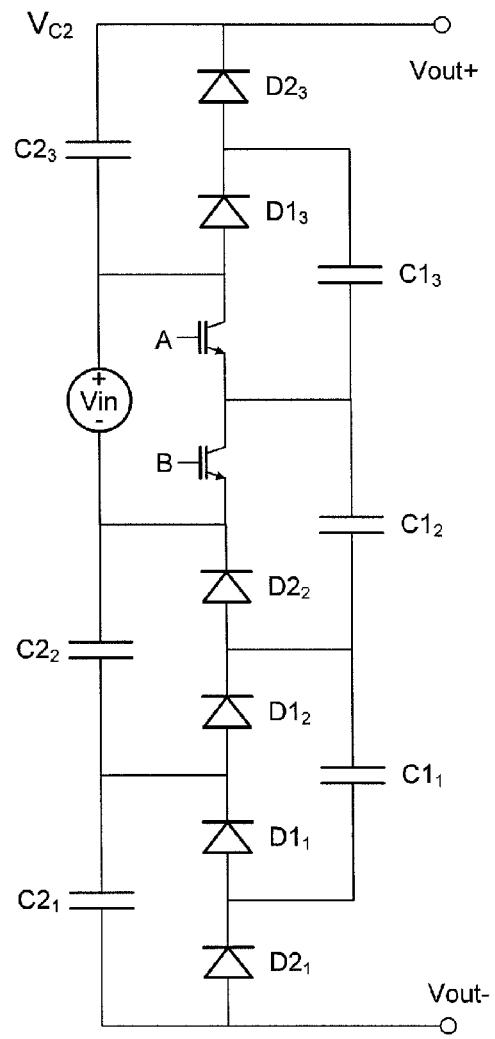

FIGS. 4A and 4B are circuit diagrams illustrating exemplary switched-capacitor DC-DC converters according to other embodiments of the subject matter described herein. FIGS. 4A and 4B illustrate the principle that a dual-ended configuration need not have the same number of voltage summing circuits connected to the top of the switching circuit as are connected to the bottom of the circuit. The converter shown in FIG. 4A and the converter shown in FIG. 4B both have a gain of 4, but their respective values of Vout+ and Vout− will not be the same relative to their respective Vin+ and Vin−.

The operation of the exemplary switched-capacitor DC-DC converters described above may be further refined by selection of the frequency at which switching circuit 204 alternates between the first and second states based on the resonance of the voltage summing nodes 202. This is illustrated in FIG. 5.

Figure 5:
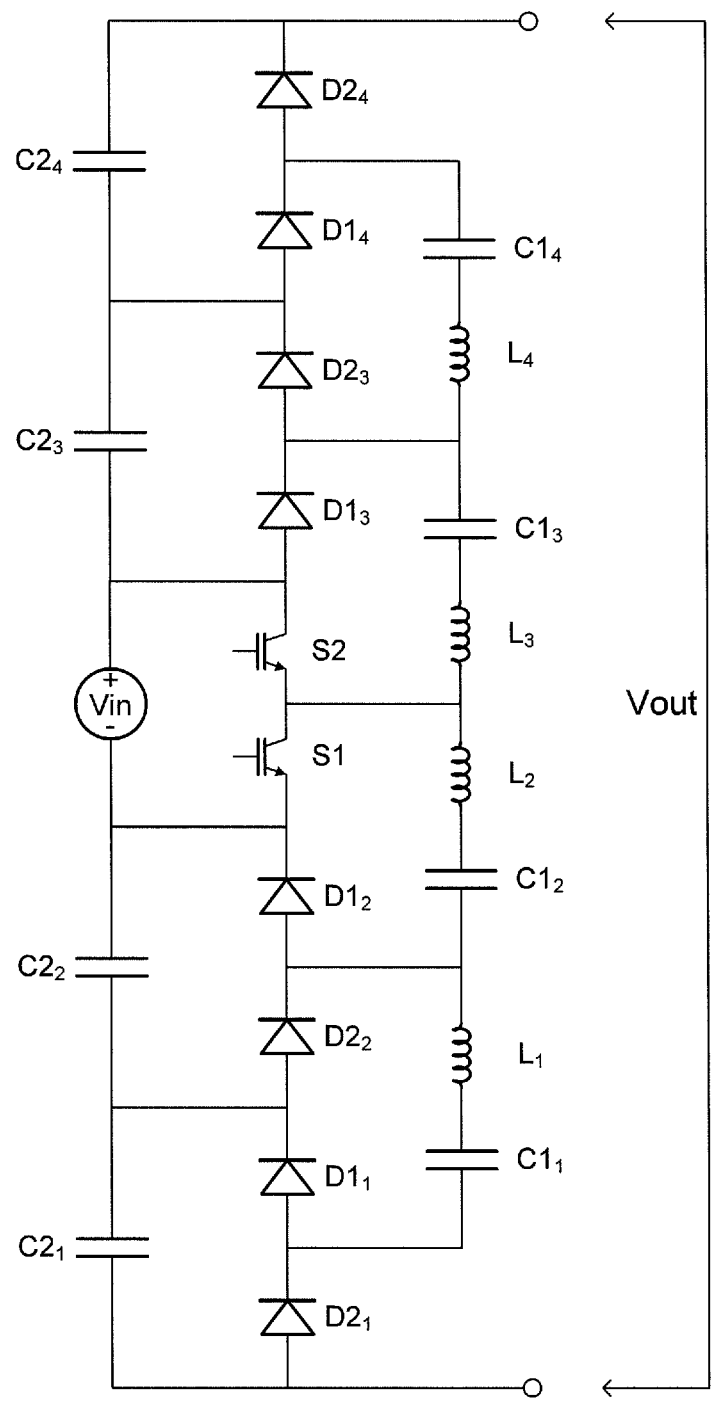
FIG. 5 is a circuit diagram of a dual-ended switched-capacitor DC-DC converter according to yet another embodiment of the subject matter described herein.

FIG. 5 is a circuit diagram of a dual-ended switched-capacitor DC-DC converter according to yet another embodiment of the subject matter described herein. In the embodiment illustrated in FIG. 5, the converter 500 includes a switching circuit, shown in simplified form as a pair of switches S1 and S2. Circuit diagram also indicates the presence of inductances L1-L4, which may represent inductors but which may also represent a parasitic or inherent inductance that may exist, for example, in wiring between capacitors $C1_1$, $C1_2$, $C1_3$, and $C1_4$. Input voltage source Vin and capacitors $C2_1$, $C2_2$, $C2_3$, and $C2_4$ power the load.

S1 and S2 are controlled complementary with 50% duty cycle. When S2 is turned on and S1 is off, capacitors $C1_1$ and $C1_2$ are charged by input voltage source Vin or/and capacitors $C2_1$ and $C2_2$ through inductors L1 and L2 in a sinusoidal waveform. Meanwhile, the energy stored in $C1_3$ and $C1_4$ is released to capacitors $C2_3$ and $C2_4$ through inductors L3 and L4 in a sinusoidal waveform. When the switching frequency is the same as resonant frequency, by the time S2 is turned off and S1 is turned on, all the currents within inductors L1-L4 have decreased to zero.

When S1 is turned on and S2 is off, the energy stored in capacitors $C1_1$ and $C1_2$, which were charged in the first half switching period, are released capacitors $C2_1$ and $C2_2$ through inductors L1 and L2 in a sinusoidal waveform. Meanwhile, capacitors $C1_3$ and $C1_4$ are charged by the input voltage source Vin or/and capacitors $C2_3$ and $C2_4$ through inductors L3 and L4 in a sinusoidal waveform. When the switching frequency is the same as resonant frequency, by the time S1 is turned off and S2 is turned on, all the currents within inductors L1-L4 have decreased to zero.

Because the currents within the inductors L1-L4 have decreased to zero by the time S1 and S2 change states when the switching frequency is the same as the resonant frequency, this is herein referred to as zero-current switching (ZCS) operation, and a DC-DC converter that operates in this manner is herein referred to as a ZCS DC-DC converter.

Figure 6B:
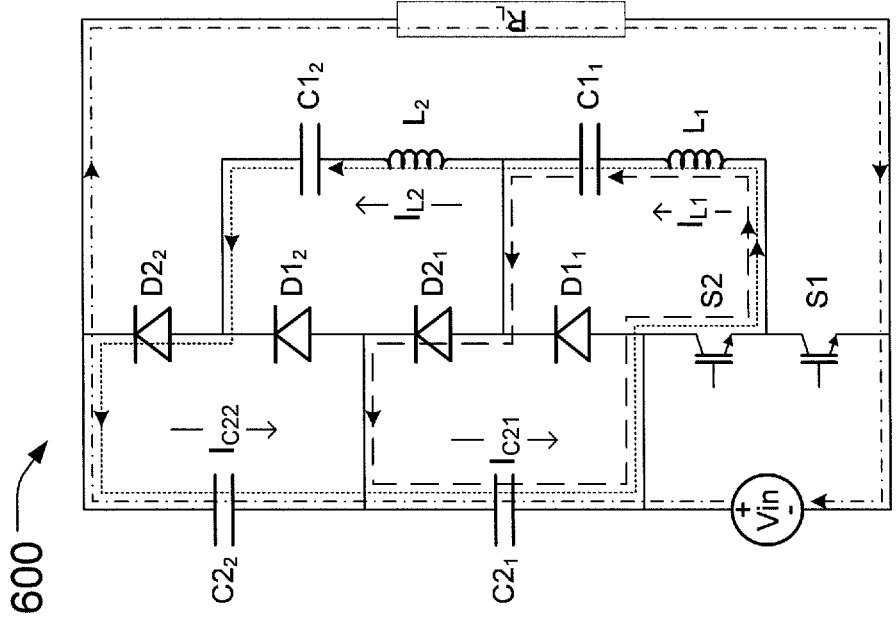
FIGS. 6A and 6B are circuit diagrams illustrating an exemplary zero current switching DC-DC converter in first and second states, respectively, according to an embodiment of the subject matter described herein.
Figure 6A:
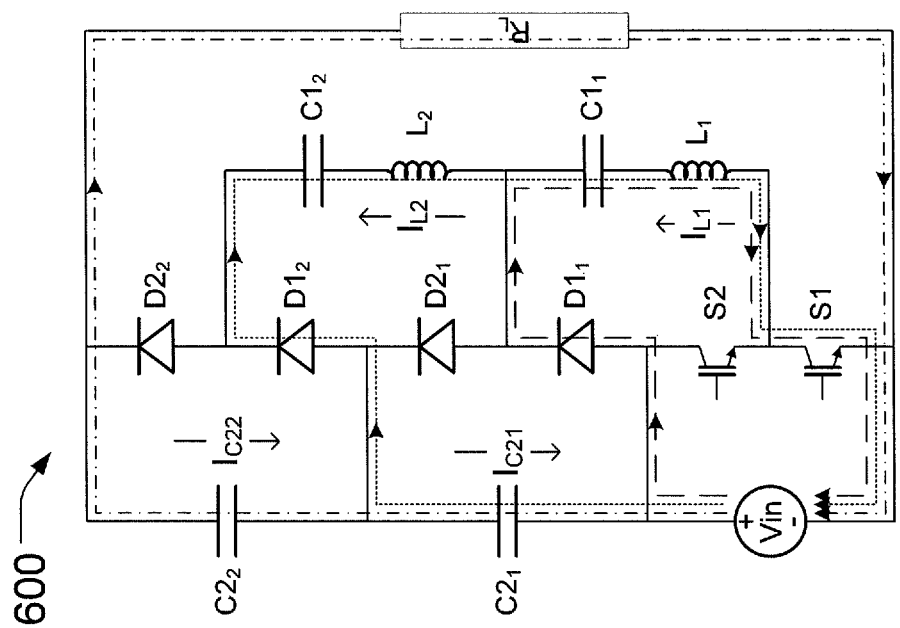
Figure 6C:
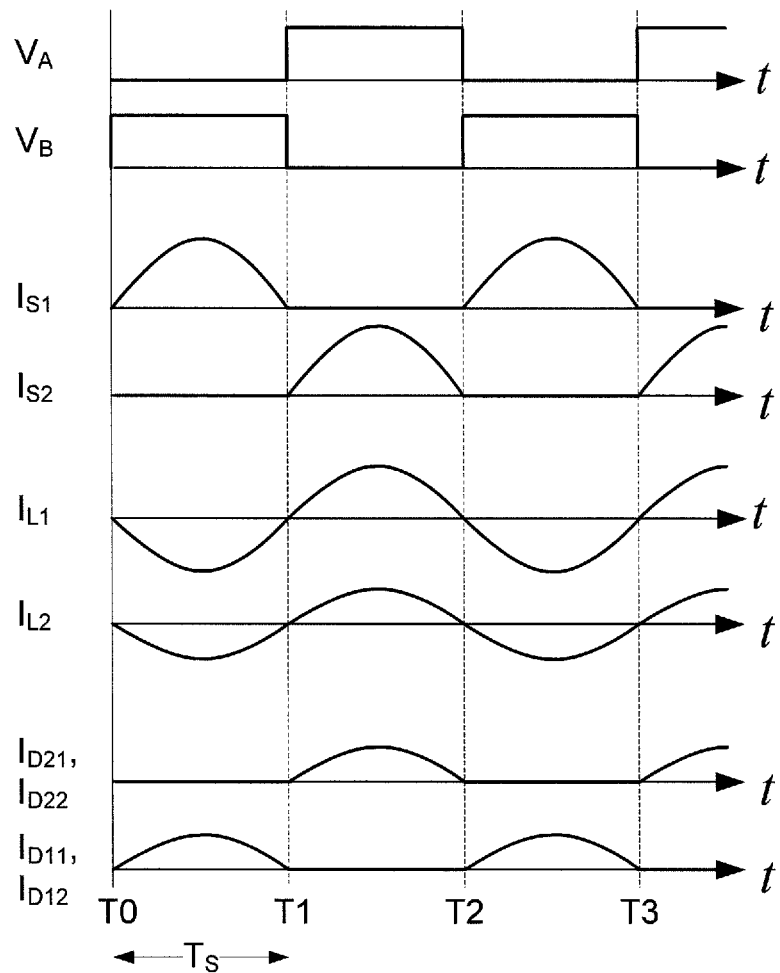
FIG. 6C is a graph showing idealized waveforms of voltages and currents within an exemplary zero current switching converter under a steady-state condition, according to an embodiment of the subject matter described herein.

This operation is shown in more detail in FIGS. 6A through 6C. For the simplicity, only the summing circuits attached above the switching circuit is analyzed, but from this analysis the operating mode of the dual-ended ZCS DC-DC converter shown in FIG. 5 can be derived. To simplify the analysis, the following assumptions are made:

All the switches, diodes, inductors and capacitors are ideal;
Capacitors $C2_1$ and $C2_2$ are sufficiently large that the voltage stored within each capacitor=Vin;
The switching frequency is equal to the resonant frequency $\omega_r = 1/\sqrt{(L_R C_R)}$, where $L_R = L_1 = L_2$ and $C_R = C1_1 = C1_2$.

FIGS. 6A and 6B are a circuit diagrams illustrating an exemplary ZCS DC-DC converter according to an embodiment of the subject matter described herein. FIG. 6A shows the operation of the converter while the switching circuit is in a first state and FIG. 6B shows the operation of the converter while the switching circuit is in the second state. FIG. 6C is a plot of voltages and currents within the converter as it alternates between the first and second states.

FIG. 6A is a circuit diagram of an exemplary converter 600 in a first state of operation, where switch S1 is closed and switch S2 is open. Three current loops are identified. A first current loop follows a clockwise path from Vin, through $D1_1$, $C1_1$, L1, and S1, and back to Vin. A second current loops follows a clockwise path from Vin, through $C2_1$, $D1_2$, $C1_2$, L2, $C1_1$, L1, and S1, and back to Vin. A third current loop follows a clockwise path from Vin, through $C2_1$, $C2_2$, and load $R_L$, and back to Vin.

FIG. 6B is a circuit diagram of converter 600 in a second state of operation, where switch S2 is closed and switch S1 is open. Three current loops are identified. A first current loop follows a counter-clockwise path from $C1_1$, through $D2_1$, $C2_1$, S2, and L1, and back to $C1_1$. A second current loop follows a counter-clockwise path from $C2_1$, $D2_2$, $C2_2$, $C1_1$, S2, L1, $C1_1$, and L2, and back to $C1_2$. A third current loop follows a clockwise path from Vin, through $C2_1$, $C2_2$, and load $R_L$, back to Vin.

FIG. 6C is a graph showing idealized waveforms of voltages and currents within converter 600 under a steady-state condition, e.g., after the circuit has completed any initialization phase.

FIG. 4 shows the circuit configuration of the ZCS RSC converter with two positive modular cells and FIG. 5 shows the idealized waveforms under stead state condition. Converter 600 enters the first state of operation at time T0, the second state of operation at time T1, the first state of operation at time T2, the second state of operation at time T3, and so on.

At time T0, voltage VB goes high while voltage VA is low. This causes switch S1 to turn on but S2 remains off. The current through S1 ($I_{S1}$) is zero at time T0, so S1 is turned on in a zero current condition. Due to the inductance of the circuit, current through S1 does not change instantaneously, but increases over time until it reaches a peak value. As the capacitors in the circuit charge, however, the current through S1 will eventually taper off to zero by the end of the switching period $T_S$, at time T1. At time T1, voltage $V_B$ goes low while voltage $V_A$ goes high. This causes switch S1 to turn off and switch S2 to turn on. Current $I_{S2}$ follows a similar sinusoid due to the inductors and capacitors along its path. By the time the cycle repeats, at time T2, current through S2 has tapered off to zero. It can be seen in FIG. 6C that the currents through all of the inductors and diodes within converter 600 follow a similar sinusoidal pattern which rises at the being of the switching period and drops to zero by the end of the switching period, except for the diodes in reverse biased mode, which do not conduct current during the switching period.

Thus, it can be seen that by choosing a switching frequency that is equal to the resonant frequency of the circuit, zero current switching operation is achieved. In the above analysis, the switching frequency is equal to the resonant frequency. In practice, however, the switching frequency should be a little lower than the resonant frequency to set aside enough dead time for two main switches.

Using embodiments of the subject matter described herein allows the creation of switched-capacitor DC-DC converters suitable for high voltage/high gain applications. For example, the DC-DC converter designs disclosed herein suitable for use as medium voltage, high power DC-DC converters for offshore wind energy systems. Moreover, operating at a resonant frequency of the voltage summing circuits allows for zero current switching operation, which is characterized by a soft switching condition for all switches and diodes. This significantly reduces switching losses and makes feasible higher switching frequencies. Because the DC-DC converter does not require a transformer, the overall system volume and weight are reduced as compared to conventional systems that use transformers.

It will be understood that various details of the subject matter described herein may be changed without departing from the scope of the subject matter described herein. Furthermore, the foregoing description is for the purpose of illustration only, and not for the purpose of limitation.

What is claimed is:

1. A switched-capacitor direct current to direct current converter, comprising:

first and second voltage summing circuits, wherein each voltage summing circuit produces an output voltage that is substantially equal to its input voltage;

and a switching circuit connected between the first and second voltage summing circuits and configured to provide a DC voltage source as an input to the first and second voltage summing circuits, wherein the converter produces an output voltage that is the sum of the voltage produced by the first voltage summing circuit, the voltage provided by the DC voltage source, and the voltage produced by the second voltage summing circuit;

wherein each of the first and second voltage summing circuits include a first capacitor, a second capacitor, and first and second diodes coupled to the first and second capacitors and wherein the switching circuit connected between the first and second voltage summing circuits is configured to connect the DC voltage source to the first and second voltage summing circuits such that:

in a first state, the DC voltage source charges the first capacitor of the first voltage summing circuit through the first diode of the first voltage summing circuit and the first capacitor of the second voltage summing circuit charges the second capacitor of the second voltage summing circuit through the second diode of the second voltage summing circuit; and in a second state, the first capacitor of the first summing circuit charges the second capacitor of the first voltage summing circuit though the second diode of the first voltage summing circuit and the DC voltage source charges the first capacitor of the second voltage summing circuit through the first diode of the second voltage summing circuit, wherein the output DC voltage is the sum of: the voltage across the second capacitor of the second voltage summing circuit, the voltage provided by the DC voltage source, and the voltage across the second capacitor of the first voltage summing circuit.

2. The converter of claim 1 wherein the DC voltage source provides a first input voltage Vin1 and a second input voltage Vin2, wherein the converter produces a first output voltage Vout1 and a second output voltage Vout2, and wherein the voltages Vout1 and Vout2 are both different from the input voltages Vin1 and Vin2.

3. The converter of claim 1 wherein, for each of the first and second voltage summing circuits, in one of the first and second states, the second diode prevents a flow of charge from the second capacitor to the first capacitor, and wherein in the other of the first and second states, the first diode prevents a flow of charge from the first capacitor to the DC voltage source.

4. The converter of claim 1 wherein, for each of the first and second voltage summing circuits, the first capacitor is connected between a first node N1 and a second node N2, the second capacitor is connected between a third node N3 and a fourth node N4, an anode of the first diode is connected to N2 and a cathode of the first diode is connected to N4, and an anode of the second diode is connected to N4 and a cathode of the second diode is connected to N1.

5. The converter of claim 4 wherein, for the first voltage summing circuit, in the first state, the switching circuit applies a first voltage V1 to node N1 and applies a second voltage V2 to node N3, and in the second state, the switching circuit applies the first voltage V1 to nodes N1 and N3, and wherein a DC voltage output from N2 is a multiple of the difference between voltages V1 and V2.

6. The converter of claim 4 wherein, for the second voltage summing circuit, in the first state, the switching circuit applies a first voltage V1 to node N2 and applies a second voltage V2 to node N4, and in the second state, the switching circuit applies the second voltage V2 to nodes N2 and N4, and wherein a DC voltage output from N1 is a multiple of the difference between voltages V2 and V1.

7. The converter of claim 4 comprising a third voltage summing circuit connected in series to at least one of the first voltage summing circuit and the second voltage summing circuit.

8. The converter of claim 7 wherein nodes N1 and N3 of the third voltage summing circuit are connected to nodes N2 and N4 respectively of at least one of the first voltage summing circuit and the second voltage summing circuit.

9. The converter of claim 1 wherein the switching circuit comprises a first switch S1 and a second switch S2 and wherein in the first state switch S1 is closed and switch S2 is open and wherein in the second state switch S1 is open and switch S2 is closed.

10. The converter of claim 1 wherein at least one of the first and second voltage summing circuits includes an inductance associated with the first capacitor and wherein the switching circuit is configured to alternate between the first and second states at a frequency such that current through the inductance has decreased to zero before changing states.

11. The converter of claim 10 wherein the switching circuit alternates between the first and second states at a resonant frequency of the at least one voltage summing circuit.

* * * * *